Nov. 13, 1934.  J. A. HEANY  1,980,800
METHOD OF AND PHYSICAL ARRANGEMENT FOR CONTACT
BREAKING AND LIGHTING APPLIANCES
Original Filed Jan. 16, 1919
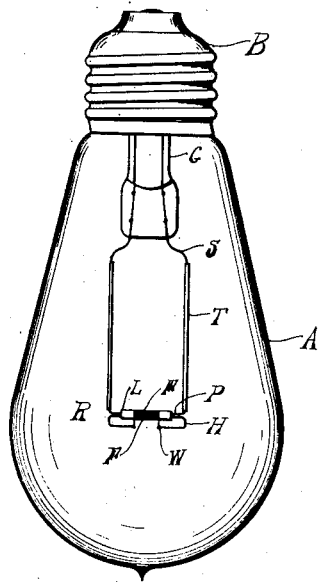
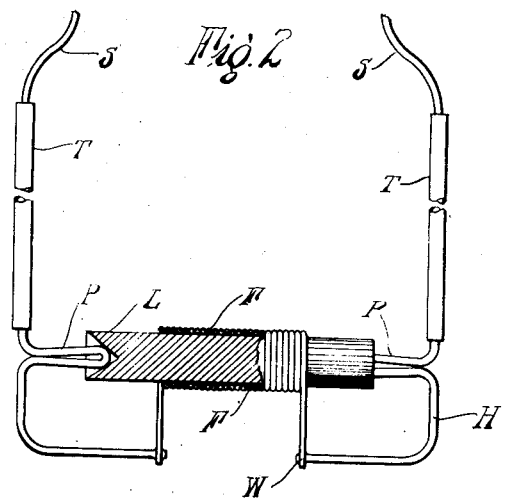
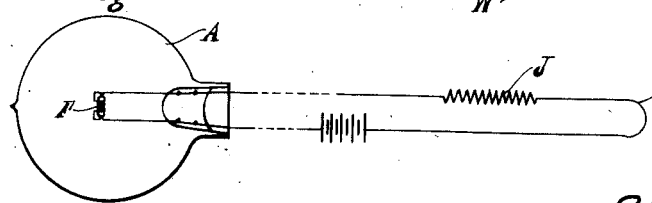
INVENTOR
John Allen Heany.
BY
Chester N Bradel
ATTORNEY Patented Nov. 13, 1934

1,980,800

UNITED STATES PATENT OFFICE 1,980,800

METHOD OF AND PHYSICAL ARRANGEMENT FOR CONTACT BREAKING AND LIGHTING APPLIANCES

John Allen Heany, New Haven, Conn., assignor to Sirian Lamp Company, New Haven, Conn., a corporation of Delaware Refiled for abandoned application Serial No. 271,352, January 16, 1919. This application August 23, 1926, Serial No. 131,054. Renewed October 3, 1932

16 Claims. (Cl. 176—17)

I have made a discovery of a physical phenomenon in its relation to the industrial arts which has apparently never been effectively observed or appreciated prior to my discovery. My invention of physical arrangement and method by which this phenomenon is rendered useful, I will point out and claim broadly in this application as a generic invention and also as an invention of a particular species. Additional species of the same generic invention will be claimed in additional applications.

This physical phenomenon may be illustrated by the following means. An ordinary bell-jar is arranged so that a vacuum may be drawn and then this vacuum may be held, or a desired gas may be introduced and held; so that thus a compactly wound coil within the jar may be subjected at will either to vacuum or to gas surroundings for a comparison of its behavior when heated under the two differing conditions. The coil is arranged so that it may be heated by the passage through it of electrical current. A heat-resisting cylindrical core normally of electrical non-conducting characteristics is coated with paraffine and the coil closely and compactly wound on it with a group of successive turns of windings. This coil is connected with a source of current by suitable lead-wires. The wire of the coil is possessed of incandescent lamp-wire characteristics, so that the comparison desired in the illustration is made readily apparent.

If electric current is passed through the coil in vacuum, the paraffine on the core is first vaporized and then is mostly condensed and deposited out of the way on the bottom of the bell-jar. This removal of the coating between the coil and core assists in providing the slight lee-way desired for the compactly wound coil to adjust itself under the influence of heat and resulting gas action to which such coil is to be subjected. A gas (preferably of inert character, as nitrogen, to avoid chemical action and excessive heat-loss around the coil) is then fed into the bell-jar and exhausted, thus taking out residual vapors of paraffine. The jar is then again filled with the inert gas. The passage of a proper electric current will now cause, under the general conditions named, a manifestation of the phenomenon to be illustrated.

When the current is turned on, the adjacent turns of the compactly wound coil perform the remarkable feat of promptly shifting from contact with each other, so as to be spaced apart and so as thus to force the electric current to flow along instead of across the successive turns of the wire so spaced. The wire is then brought to incandescence. If now under the same conditions in other respects the gas is withdrawn from the jar, leaving the coil surrounded by a vacuum, its successive turns immediately so close up together as to produce sufficient physical and electrical contact to short-circuit contacting turns, thus reducing the resistance so that the wire no longer remains incandescent. The spacing apart of the turns of the coil in the presence of the gas is, therefore, according to my present belief, a result of a dynamic condition of the gas molecules surrounding the compactly coiled wire under the influence of heat emanating from the heated wire, which dynamic condition acts upon the turns of the coil so as to space and hold them apart. Moreover, the dynamic condition of gas molecules under the conditions described not only causes a spacing of adjacent turns of the coil apart from each other but also operates to space any portion of a turn from contact with the supporting body within the coil. Thus, if the coil or a portion of it is physically free to move apart from the core or other support or contact, the action of gas molecules as influenced by the heated wire is effective to space the wire apart from the core or other support or contact.

In the general arrangement of coil and support mentioned, the action is for the coil to open out free from the core with its turns spaced apart, apparently because the heat caused by resistance of the wire to the electric current quickly creates a molecular activity or accumulating pressure of gas molecules in confined very small spaces between the wire and the core and between turns of the wire which forces them apart, acting against any mechanical, gravitational, magnetic, and other forces of less aggregate amount tending to keep or bring them closer together. The force causing the action is comparable to that which causes a drop of water to ride above a hot plate and to be held spaced apart from the plate by a molecular activity sufficient to overcome the force tending to establish actual contact. Under the conditions created by the above illustrating apparatus, however, the heat-emitting body is the thing spaced or suspending.

The broad invention is useful in the arts under conditions where it is desired to very closely space a portion of one body from another in spite of a physical arrangement which would or might otherwise cause them to contact. It is particularly useful in the electrical arts in avoiding or breaking electrical contact between portions of conductors under conditions where it is desired to keep, at least temporarily, the portions close together, but still far enough apart to avoid a short-circuiting contact.

This is desirable in very many instances, as for example, in delicately contrived switches and closely coiled conductors. In the latter instance, the turns of the coils should be spaced apart just enough to avoid short-circuiting contact in order to get the best effect. This is well understood in the case of transformer coils and coils for use in incandescent lighting where the function desired is best secured by the insulatingly-separated but closely-spaced physical arrangement. The construction of coils, with closely-spaced turns and with an insulation of the turns by spacing one from the other to avoid short-circuiting contact, has heretofore required mechanical skill of a high order, and, moreover, the dependence upon mechanical skill has not uniformly or even generally resulted in as evenly and closely spaced turns, properly insulated one from the other, as is to be desired.

According to one principal feature of my invention, a portion of a structure is at least temporarily very closely spaced from another portion by the activity of adjacent gas molecules under the influence of heat emanating from one of these portions in spite of an initial physical arrangement which would otherwise hold the portions against the desired spaced arrangement.

According to another important feature of the invention, the turns of a coil of conducting wire, in order to avoid short-circuiting contact between them, are spaced apart in consequence of the adjacent presence of gas heated by the conducting wire. The coil in this instance may be spaced apart from the core within the coil in consequence of the adjacent presence of gas heated by the coil.

According to the feature of my invention which I have chosen for illustrative purposes as one of the extremely important specific uses to which it may be put in the arts, the incandescing filament of an electric lamp is compactly coiled on a core, and, when the electric current is turned on, the turns of the coil in consequence of the presence of gas in the container heated by the filament become spaced apart so as to avoid short-circuiting contact between the compactly coiled turns. The arrangement is preferably made so that the spaced turns are like-wise spaced apart from the core in consequence of the presence of the gas heated by the coil and against an original but counteracted tendency of the turns to contact with the core. The core is particularly useful in the performance of the function desired for the particular appliance if the core is made of material which is normally non-conductive and which will contribute to the illuminating effect by that property of the material termed "favorable selective radiation." These materials appear, when heated to incandescence, to select those rays for radiation which will best contribute to the lighting effect, and, for this reason, I have termed the property "favorable selective radiation." Thoria and zirconia are examples of materials which will serve my purpose for the function of the core. The particular relation of the coil and the core creates two sources of light, one energized by the other, so that the coil may be considered the primary luminant, the core the secondary luminant, and the two together the "radiant" or source of light. For convenience in certain relations, the parts will be so termed in the description.

By means of the specific structure illustrated and to be described as one means of putting the broad invention in use, I do not intend to limit the broad invention to the specific art or use in incandescent lamps. I do wish to emphasize the fact that the chosen illustration and description of the invention as applied to incandescent lamps not only serves to bring out the important and broad features of the invention but also to bring out features of invention in the incandescent lamp art some of which are and some of which are not based upon the conception of the invention in its basic feature as will appear in the claims.

Referring to the drawing.—

Fig. 1 is a view of the invention embodied in a complete incandescent electric lamp of substantially full-size;

Fig. 2 is a detail view of the radiant or source of light with the parts enlarged, showing diagrammatically the relation of the parts to better advantage than in Fig. 1; and Fig. 3 is a diagrammatic view illustrating another application of the invention.

The lamp is shown in the ordinary form with bulb A, base B, and leading-in wires for connection to the filament. The wire sections S are made of material strong enough to serve as a support for radiant R and its connections T and H. The wire sections S, T, and H preferably serve the double function of supporting and current-conducting means for the radiant. Wire sections T have the additional function of serving as means of ready attachment thereto of sections S and H. Sections S and sections H are made up separately from sections T for convenience in respectively sealing-in the wire leads through the glass stem G and making the desired connections to the radiant as well as to enable a choice of material for sections S, T, and H, for their respective functions.

Wire sections T, as indicated, are preferably of tubular construction, either seamless or seamed, so that wires S and H may be slipped in opposite ends and the tube pinched tightly against these wires to hold them. A nickel tube will function well for all purposes of wire sections T. Wire sections S will function for my purpose if made of iron. Wire sections H, which have a rather special purpose in the particular illustration, will function if made of tungsten or tungsten alloy or molybdenum.

These wire sections H, one on each of the radiant are constructed with a right-angle return bend P to extend into a cup-shaped bearing-recess at the end of the core or secondary luminant L. The wire sections S, T, and H are constructed with sufficient spring tension to cause sections H to bear in the end recesses of core L to hold it in the relative position shown. This holding arrangement for the core is preferably made strong enough to maintain the parts in position while still permitting slight relative movement which will prevent breakage. Each section H from its bend P is again bent to meet its corresponding tangentially-extending end of the coil of filament wire comprising the primary luminant F. At the meeting point, the two wires are preferably joined by an electrical weld W to effectively unite them in about the position indicated.

The secondary luminant L is made of a material having the property of favorable selective radiation, as thoria or zirconia. The latter are so-called "rare metallic oxides," but it is the properties of these materials in their relation to my invention which I wish to point out broadly as suitable for my purpose, rather than the specific materials mentioned by way of example. The cylindrical core forming the secondary luminant may be advantageously prepared, according to the procedure outlined in my Patent 1,640,829, granted August 30, 1927 on application Serial No. 234,756, filed May 15, 1918, and treated to exclude its trapped gases, as set forth in my Patent 1,592,459, granted July 13, 1926 on application Serial No. 262,616, filed November 14, 1918.

The wire of the primary luminant is applied by winding it upon the cylinder comprising the secondary luminant in compacted turns one against the other with the end portions of the secondary luminant left bare and exposed, as indicated in Fig. 2, and the wire is then joined to the wire sections H as described. It is desirable to provide room for sufficient movement of the turns one with respect to the other so as to permit the insulatingly-spaced relation between turns and between the coil and its core when the current is turned on. The expansion of the metal of the wire under heat will give some room, but I prefer to aid in accomplishing these results by placing a thin film of removable material, as paraffine or ceresine, on the secondary luminant or core and winding the primary luminant or filament wire on the core thus coated.

In the manufacture of the lamp, the bulb is exhausted, current is passed through the wire sufficient to vaporize the removable coating on the secondary luminant,—during this time the bulb is preferably warmed to prevent deposition of the vapors of the coating,—the bulb is filled preferably with an inert gas, as nitrogen (or argon), the bulb is again exhausted to remove the vapors of the removed coating, and the bulb is again filled with inert gas at about atmospheric pressure and sealed off. The operations thus described can be readily carried out by one skilled in the art.

The lamp, when thus prepared for use, will embody my broad invention as well as specific inventions in the particular art shown for illustrative purposes. When current is passed through the lamp with the gas surrounding the radiant, the primary luminant will open to insulatingly separate the several turns and cause the current to flow along the turns rather than across them as soon as the heat is sufficient to cause the spacing effect. The primary luminant becomes incandescent and becomes spaced apart from the secondary luminant a slight distance. The heat causes the secondary luminant to become incandescent, and, on account of its property of favorable selective radiation, it greatly increases the light-emitting function of the lamp.

The materials of which I may construct the secondary luminant, as thoria and zirconia, become slightly conductive at very high temperatures, but are only conductive when these critical temperatures are reached, and there is then danger that the secondary luminant might short-circuit the primary luminant and thereby materially affect the lighting function unless special provision is made to prevent this action. In the structure shown, I have provided against this liability of short-circuiting the primary luminant by leaving the end portions of the secondary luminant bare and exposed and far enough away from the heat source, so as to prevent the high critical temperature being reached at the ends of the core. The prevention of the end portions reaching the critical temperature may be attributed to several causes. The exposed portions, due to the low heat conductivity of the material composing the secondary luminant, conduct but a small amount of heat from the incandescent portion of the luminant. This small amount of heat is radiated from the exposed portions with sufficient rapidity to prevent the possibility of their attaining the critical temperature. The points of contact with conducting wire sections P are located at the cooler ends of the core or secondary luminant. The latter is not conductive at the points of contact by reason of the arrangement described, and the short-circuit cannot be established unless these points of contact are conductive, but they do not become conductive no matter how hot the central section of the core may be.

The wire sections H and P should be of material which will not lose its function for holding the radiant even under the high temperatures of the incandescent radiant. Since this wire may be properly selected of small cross-section, so as to lose its heat rapidly, and of small heat-producing resistance, it will stand up and function under its conditions of use.

The relations of the parts and the conditions just above described are important for the reason that under these conditions and relations the secondary luminant may be made up with a larger cross-section and shorter length than under conditions relying on a careful adjustment of the dimensions for necessary resistance to a short-circuit under the high temperatures of efficient operation. The large cross-section and short length of the radiant thus permitted lessen convection, radiation, and other losses from the radiant, as will be understood by those skilled in the art.

The radiant or source of light, according to my invention, is so constructed that it possesses great durability at the operating temperature upon the ordinary commercial circuits. Under conditions of operation, the filament wire (which is ordinarily the first of the parts to malfunction and render a lamp useless) is supported over substantially its entire length by the action of the highly heated gas spacing it from the core, so that the filament wire is not under strain at its ends, as in other lamps of the filament type. When the current is turned off and my lamp becomes cold, the filament wire is brought to rest upon the core, the turns close into contacting position, and the filament wire, now fully relaxed, is properly supported at rest to save it from fatigue and prolong the life of the lamp. The lamp will also possess especial efficiency for utilizing electric energy to produce light for convenient use. It will even efficiently develop a high degree of illuminating power in small-sized lamps using currents of relatively low voltages.

In Fig. 3 I have illustrated diagrammatically an arrangement whereby the broad invention above described for illuminating purposes may be used to stabilize the current of a circuit in which there are one or more delicate electrical appliances. In Fig. 3 of the drawing, A denotes a physical arrangement of parts and conditions of one or more devices similar to the device of the lamp structure described, except that the current designed to pass through device A and operate it, in this instance, may be controlled by different physical dimensions of the parts of device A. C denotes a circuit having an electrical appliance J connected for operation by the current. One or more of the devices A may be connected in series with appliance J. The circuit C is designed, under normal conditions, to permit the wire turns F of devices A to be short-circuited. If, however, an abnormal current tends to pass through wire of the circuit C and thus through turns F of devices A, there will be produced in the turns an amount of heat sufficient to energize the adjacent gas molecules to cause a separation of the wire turns F so as to insulatingly space them one from the other. This separation will increase the resistance of the circuit C, and the action will continue until the desired stabilized condition of current has been established in the circuit C by the increase of resistance due to these devices A. As long as there is an abnormal condition tending to increase the current in circuit C, the increased resistance will maintain the current within safe limits. As soon as the current in the circuit C tends to return to normal conditions, the heat in the turns of the coils of devices A decreases and in consequence the insulatingly-spaced turns of devices A close to short-circuiting contact, allowing a return of the coils to their original condition. The arrangement diagrammatically illustrated in this figure may be utilized to protect the delicate electrical appliances in a circuit from an injurious change of current conditions in the circuit. The use just above described is illustrative only of one of the many additional uses to which the broad invention may be put in the arts.

What I claim is—

1. The method of electrically insulating surfaces of turns of coiled wire which are initially close together in contacting relationship which consists in placing said wire adjacent to but movable from a solid surface; surrounding said wire and surface with a gas; and heating the wire by the passage of electric current therethrough, said solid surface serving as a heat reservoir for heat radiated from said wire.

2. The method of electrically insulating adjacent surfaces of turns of coiled wire which are initially close together in conducting relationship which consists in placing said wire adjacent to but movable from a solid surface; surrounding such wire and surface with a gas in a closed container; and heating the wire by the passage of electric current therethrough.

3. The method of electrically insulating adjacent surfaces of turns of wire coil normally in conducting relationship which consists in supporting the turns so that they may yield and in juxtaposition with an additional solid; immersing said coil and additional solid in a gas; and then heating the wire sufficiently to cause electrical insulation of the adjacent surfaces of said turns from each other under the influence of heat emanating from said wire and modified by said additional solid.

4. An incandescent electric lamp comprising: a bulb containing an inert gaseous medium, a closely coiled helical primary luminant of highly refractory metal and a cylindrical secondary luminant of highly refractory material, said primary luminant being loosely and eccentrically mounted around said secondary luminant and adapted to be opened and uniformly spaced from said secondary luminant when current is passed through it.

5. The process of associating the primary and secondary luminants of a radiant for incandescent electric lamps, which consists in coating one of the aforesaid units with a film of removable material, closely winding the primary luminant tightly on the secondary luminant and then removing the film.

6. The process of associating the primary and secondary luminants of a radiant for incandescent electric lamps, which consists in coating one of said members with a film of volatilizable material, closely winding the former tightly on the latter, and then removing the film.

7. The process of associating the primary and secondary luminants of a radiant for incandescent electric lamps, which consists in coating one of the aforesaid units with a film of a solid hydrocarbon, closely winding the primary tightly on the secondary and then volatilizing the film of hydrocarbon.

8. The process of associating the primary and secondary luminants of a radiant for incandescent electric lamps, which consists in coating one of the aforesaid units with a film of a ceresine, closely winding the primary tightly on the secondary and then volatilizing the film of ceresine.

9. The process of associating the primary and secondary luminants of a radiant for incandescent electric lamps, which consists in coating the secondary luminant with a film of removable material, closely winding the primary luminant tightly on the coated luminant, and then removing the film.

10. The process of associating the primary and secondary luminants of a radiant for incandescent electric lamps, which consists in coating the latter with a film of ceresine, closely winding the former tightly on the latter, and then volatilizing the film of ceresine.

11. The process of associating the primary and secondary luminants of a radiant for incandescent electric lamps, which consists in coating the secondary with a film of solid hydrocarbon, closely winding the primary tightly on the coated secondary, and then volatilizing the film of hydrocarbon.

12. An incandescent lamp comprising a bulb containing an inert gaseous medium; a coil illuminant of refractory material positioned within said bulb, the coils of said illuminant being, when unheated, normally in contact with each other; a solid body within said bulb on which the coil is loosely mounted and movable relative thereto, said solid consisting in a body adapted to absorb heat from the coil when heated.

13. In an incandescent lamp, the combination of a transparent casing; an inert gas within the casing; a core in said casing forming a secondary illuminant; a coil wound around said core and forming a primary illuminant, some of the turns of said coil when unheated being in physical contact with the core and in electrical contact with each other.

14. An incandescent lamp comprising a bulb containing a gaseous medium; a support formed of refractory material normally non-conducting within said bulb; a coil adapted to form an illuminant positioned on said support and normally in contact therewith when unheated; and means for heating said coil including an electric current, the turns of said coil being normally in conducting relationship with each other when unheated.

15. In a device of the class described, the combination of a transparent bulb; an inert gas contained within said bulb; an electrically non-conducting support positioned within said bulb; an electrical conductor formed of bare coiled wire, positioned on and in contact with said support, the turns of the coil being in contact with each other; and heat producing means effective to displace the turns of the coil from contact with each other.

16. In an incandescent lamp the combination of a bulb, a core in said bulb, a coil surrounding said core, some of the turns of said coil contacting with other turns, and a gaseous medium at atmospheric pressure within the bulb.

JOHN ALLEN HEANY.